Figure 1:
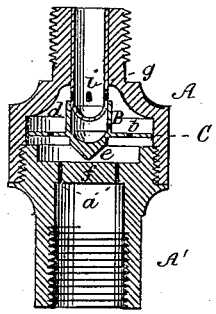

M. G. WILDER.
Gas Regulator.

No. 230,846.  Patented Aug. 3, 1880.

Witnesses:

Inventor:
Moses G. Wilder.
By his Atty.
John S. Thornton.

UNITED STATES PATENT OFFICE.

MOSES G. WILDER, OF BROOKLYN, NEW YORK.

GAS-REGULATOR.

SPECIFICATION forming part of Letters Patent No. 230,846, dated August 3, 1880.

Application filed January 21, 1880.

*To all whom it may concern:*

Be it known that I, MOSES G. WILDER, a citizen of the United States, residing at the city of Brooklyn, Kings county, and State of New York, have invented certain new and useful Improvements in Gas-Regulators; and I hereby declare the following to be a full, clear, and exact description thereof, reference being had to the accompanying drawings, making a part of this specification.

This invention relates to improvements in regulators for regulating or controlling the flow of gas to gas-burners, so as to maintain a constant delivery of a predetermined quantity in a given time. It is also applicable for regulating or controlling various other fluids under pressure for the purpose of maintaining a constant rate of delivery.

In Letters Patent of the United States No. 223,570, granted to me January 13, 1880, I have described and claimed as an improvement in gas-regulators a check provided with perforations through which the gas passes, fitted in the chamber of a regulator and sustained by the pressure of the gas below it, the said perforations being of a proper size to deliver the required volume of gas at a pressure equal to the weight of the check itself, and the said check operating, in connection with suitable inlets, in such a manner that it controls automatically the supply of gas by which it is sustained. In that improvement the check operates to increase and diminish the supply into the chamber of the regulator.

In my present improvement also a check provided with perforations through which the gas passes is sustained in the chamber of the regulator by the pressure of the gas below it; but in this case the said check operates, in connection with a balanced valve located above it, so as to increase or diminish the supply from the chamber to the tip. In other words, it controls the outlet from the chamber to the tip, instead of the inlet into the chamber from the service-pipe, and its operation is to impede the delivery of the gas from the chamber to the tip, and thus increase the pressure or volume above the check in a similar manner as in the former case it operated to increase the pressure or volume below the check.

This invention consists in a check fitted to work freely within the chamber of the regulator as the pressure of gas under it and above it varies, and having perforations through it of proper size to allow the required volume of gas to pass at a pressure equal to the weight of the check, in combination with a balanced valve located at the upper part of the gas-chamber, forming an outlet, which is opened or closed by the descent or rise of the check, so as to maintain an equilibrium of pressure or volume within the chamber above and below the check, as hereinafter specifically set forth; also, in the novel construction and combination of parts, as hereinafter particularly described.

Figure 2:
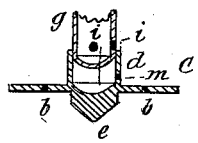
Figure 3:
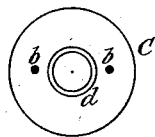

In the accompanying drawings, Figure 1 represents a vertical transverse section of my improved regulator; Fig. 2, a vertical section of the check, taken through its center, together with the valve, drawn to a larger scale; and Fig. 3 a plan view of the check.

Similar letters of reference indicate corresponding parts in all the several figures.

A and A' represent the two parts or sections forming the body of the regulator, the upper part, A, being screwed onto the lower part, A', in the usual manner, and the latter being connected with the supply-pipe, and the former with the gas-tip. B is the gas-chamber, within which is fitted the check C, so as to move freely up and down according to the varying pressure or volume. The gas is admitted into the chamber B through ways $a$.

The check C is made in the form of a disk, and provided with perforations $b$, through which the gas passes into the upper part of the chamber B. These perforations are to be of proper size to allow the required volume of gas to pass at a pressure equal to the weight of the check, and the weight is proportioned to the pressure at which the gas is expected to enter the chamber, so that it will be lifted whenever that degree of pressure is exceeded. On the upper surface of the said disk is a short tube, $d$, the purpose of which is hereinafter explained, and on its under side is a projecting point, $e$, which rests upon the partition $f$ when the check is at its lowest position. This point $e$ is simply for the purpose of reducing the contact-surface, so as to obviate the possibility of the disk sticking.

At the top of the chamber B is another short tube, $g$, of such external diameter that it will fit closely into the tube $d$. This tube $g$ forms the outlet from the chamber, and is closed at its lower end and provided with one or more perforations, $i$, through its sides to allow the gas to pass to the tip. When the disk is raised the tube $d$ passes over the tube $g$, and thereby partially cools these perforations and impedes the exit of the gas. These tubes $d$ and $g$ together constitute the balanced valve, and it will be seen that this valve is, by reason of its construction, wholly unaffected in its operation by the pressure of gas upon any part of its surfaces. A small perforation, $m$, is made in the tube $d$, to prevent a vacuum being formed in the same in case of any sudden decrease of pressure or volume.

From the above description it will be perceived that the valve and check co-operate to maintain an equilibrium in which the pressures above and below differ by an amount of pressure equal to the weight of the check and its adjuncts, and the gas flows to the burner at a constant rate, the said rate being proportionate to the weight of the check and the size of its perforations. It will also be understood that it is essential that the valve shall be a balanced valve, for otherwise the check would not rest in a position depending solely upon its weight.

I am aware that rheometers have been made with valves over the cup or bell, operating to impede the flow of gas to the burner; but the valves in those are unbalanced, and consequently the pressure of gas upon the valve tends to raise it more or less than is sufficient to maintain a constant delivery, and for this reason all such instruments will deliver less gas at high pressures than at low pressures, while by means of my improvement the delivery is constant under all circumstances.

I am also aware that attempts have been made to dispense with the glycerine seal and bell of rheometers by the use of a conical float, the point of which enters the gasway above it, and thus regulates the flow to the burner; but in that case the same difficulty is encountered.

A balanced valve is essential, inasmuch as the equilibrium to be maintained is so delicate that the valve must be balanced in order to insure accuracy of delivery. In my regulator there is, practically, no increase of pressure, as the check is free to rise and fall with every variation of volume; hence there is no resistance, and consequently no increase of pressure.

I do not claim, broadly, a balanced valve in a gas-regulator.

What I claim as my invention is—

1. A check, C, made in the form of a disk, provided with perforations of proper size to permit the passage of the required volume of gas at a pressure equal to the weight of said check and fitted to work freely within the chamber of the regulator, in combination with a balanced valve located at the upper part of the said chamber, the said valve being constructed, substantially as described, so as to be entirely independent of and unaffected by the pressure of the gas on its surfaces, and forming an outlet which is opened and closed, respectively, by the descent and rise of the said check, substantially as and for the purposes herein described and set forth.

2. The check C, made in the form of a disk and provided with perforations $b$ and a short tube, $d$, extending upward from its upper surface, in combination with the tube $g$, located at the upper part of the chamber B, provided with perforations $i$, and fitted to work within the said tube $d$, as and for the purpose set forth.

3. In combination with the inlet and outlet of a gas-regulator, a balanced valve fitted and operating in connection with a perforated check in the chamber of the regulator to maintain an equilibrium of pressures, the said valve being constructed, substantially as described, so as to be entirely independent of and unaffected by the pressure of the gas upon its surfaces, substantially as set forth.

MOSES G. WILDER.

Witnesses:
WALTER NICHOL,
JOHN S. THORNTON.